Sept. 20, 1966 E. M. EIGENBRODE 3,273,253
PRECISION GAGE FOR SETTING CHASERS
Filed Jan. 8, 1965
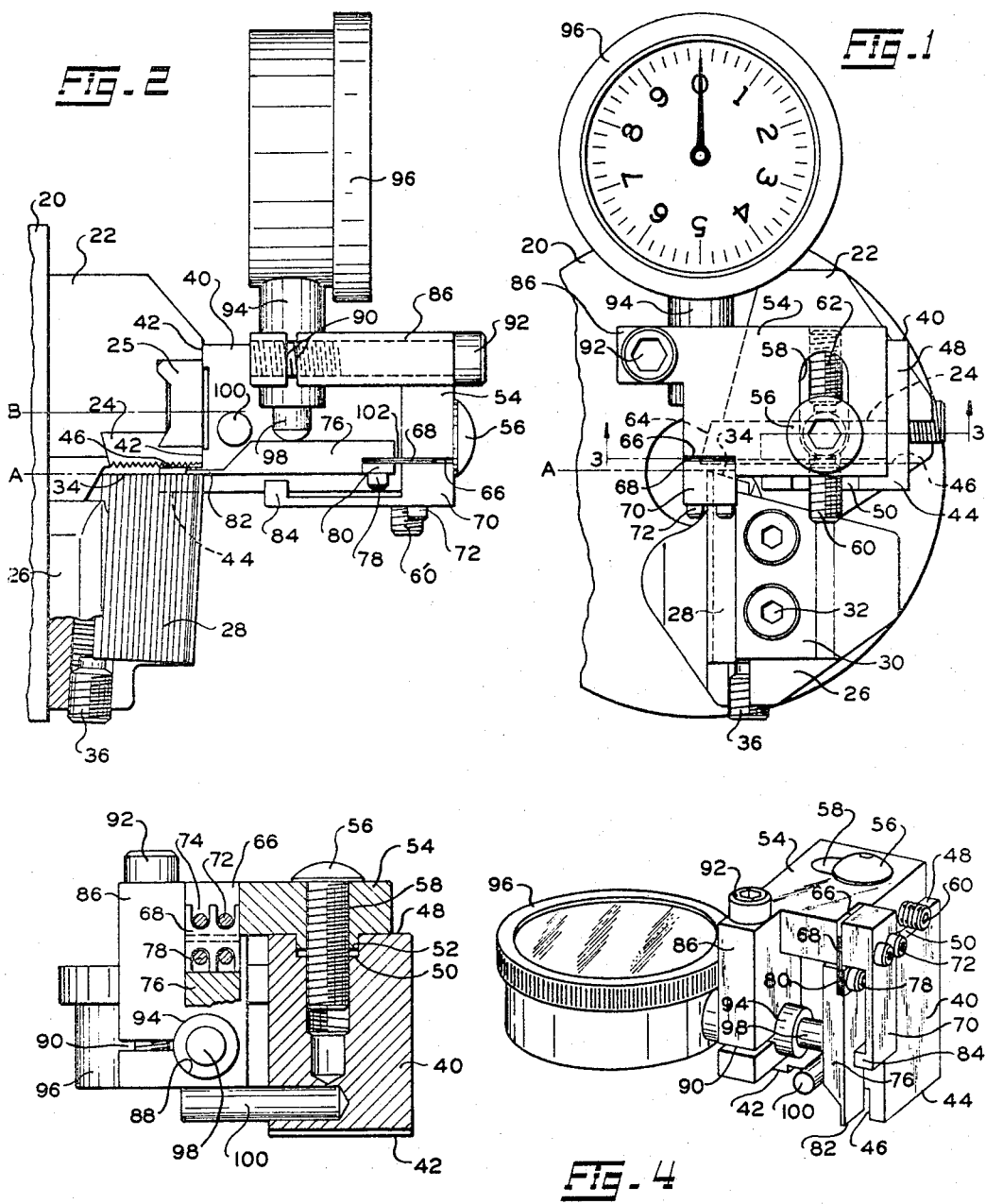
INVENTOR
EDWIN M. EIGENBRODE
BY
Strauch, Nolan & Neale
ATTORNEYS United States Patent Office 3,273,253
Patented Sept. 20, 1966

3,273,253
PRECISION GAGE FOR SETTING CHASERS
Edwin M. Eigenbrode, Waynesboro, Pa., assignor to Landis Machine Company, Waynesboro, Pa., a corporation of Pennsylvania
Filed Jan. 8, 1965, Ser. No. 424,379
6 Claims. (Cl. 33—185)

This invention relates to gages for setting thread-cutting chasers in a die head and more particularly to gages for establishing the cutting position of tangential chasers with micrometric accuracy.

In the well known tangential chaser type of die head to which this invention is particularly applicable, the thread cutting members, called chasers, are carried by chaser holders mounted on the die head. The chaser holders are usually mounted for rocking movement on the die head to move the cutting edge of the chaser generally radially of the workpiece and the chasers are supported in the holders for movement tangentially of the workpiece.

In setting up a die head the chaser holders are first moved by conventional means to position the chaser supporting surfaces a fixed distance from the axis of the die head. It is then necessary to move the chasers in the holders to dispose the chaser cutting edges at the desired position with respect to the axis of the workpiece. The chasers are adjusted in the tangential direction to proper thread-cutting position by means of a set screw threaded in the chaser holder member and abutting the rear or outward end of the chaser. The instrument heretofore in use for gaging the adjusted position of the chaser comprises a bent piece of steel having a portion engaging the cutting edge of the chaser and a second portion adapted to lie closely adjacent to the top of the chaser holder member. This second portion is provided with stamped lines intended to be brought into registry with corresponding lines stamped on the chaser holder member when the cutting edge of the chaser is properly adjusted in the tangential direction.

Although this type of gage has been widely used for many years, its accuracy is inherently limited in several respects. The positional accuracy of the cutting edge of the chaser is wholly dependent upon direct visual estimation of the registry of a line on the gage with another line on the chaser holder. As a practical matter, these lines, being stamped into metal, have a certain width. The width of the line on the gage may differ from that on the chaser holder. Consequently, bringing the lines into registry involves aligning the invisible longitudinal axis of one line with that of the other line. Aside from the width of the gaging lines, the accuracy of their location is a factor influencing the chaser setting. This is a particularly serious problem with respect to the gage itself since its gaging accuracy is dependent upon the accuracy of the distance from the line to the bent portion that contacts the cutting edge of the chaser. Any slight, inadvertent dislocation of the bend which would not be apparent to the user can destroy the accuracy of the gage. Some parallax is also involved in the use of this gage, to the detriment of the accuracy of the results obtained.

Accuracy of chaser setting affects the dimensional precision of the threads cut and their surface quality as well as the service life of the chasers. The latter is particularly sensitive to minute differences in the positions of the individual chasers in a set with respect to a single workpiece. Such differences will subject one or more chasers of a set to a disproportionate share of the cutting load and thus cause the cutting edges thereof to deteriorate more rapidly. Accordingly, there has been a continuing demand for a means for setting chasers with greater accuracy. The present invention fulfills this need.

The device of the invention is used with the chasers and chaser holders in operating position on a die head. This has the advantage of saving the time that would otherwise be required to remove and replace the chaser holders but at the same time places restrictions on the space available for operation of the gage. In an exemplary case wherein the die head is provided with four chasers and chaser holders, equally spaced about the circumference of the workpiece, the gage of the present invention is seated on a chaser holder spaced 90 degrees from the holder supporting the chaser being gaged. The gage has one stationary reference surface which is placed against the multi-grooved surface of the chaser carried by the holder on which the gage is seated.

The multi-grooved surface on the chaser against which the gage reference surface is placed is accurately located by the head adjustment in a direction radially of the workpiece, a necessary condition to cutting the precise diameter required. The other or movable measuring surface of the gage contacts the cutting edge of the chaser being adjusted. Since the stationary reference surface is precisely located with respect to the workpiece center and since the distance between said surface and the movable measuring surface can be accurately measured, such measurement is a precise determination of the setting of the chaser along its longitudinal axis. A dial indicator is provided in the device to register this measurement to within a thousandth of an inch. The gage of the present invention thus locates the cutting edge of each chaser independently of any stamped lines and without removing the chaser holders from the die head. The accuracy of such location is thus dependent upon metal contact, not visual estimation.

Accordingly, it is an object of this invention to provide a gage for locating the cutting edge of a thread cutting chaser with micrometric accuracy while the chaser is in cutting position on a die head.

Another object is to provide such a gage which will use a previously accurately adjusted surface as a datum surface from which measurements may be made.

It is a further object of the invention to provide a gage as described above with means to adjust the location of a measuring surface so that the device will accommodate the complete diametral range of a die head.

A still further object is to provide a gage as described above which can be pre-set to a given dimension for effecting a series of identical measurements.

Another object is to provide a gage as described above, characterized by small size, simplicity, ease of operation, a minimum number of operating parts and maximum adaptability and accuracy.

Other objects and advantages of the invention will be apparent from the following detailed description of an exemplary embodiment thereof and from the accompanying drawing. In the drawing:

FIGURE 1 is a plan view showing the new setting gage in operative position on a die head normally equipped with four chasers and chaser holders, two of which have been removed to illustrate the gage more clearly;

FIGURE 2 is a side elevation of the gage shown in FIGURE 1 in operative position;

FIGURE 3 is a sectional view taken substantially along line 3—3 of FIGURE 1; and FIGURE 4 is a view in perspective of the gage.

FIGURES 1 and 2 illustrate a part of the thread cutting die head 20 on which the chaser setting gage of the invention is to be used. This exemplary and conventional die head employs four tangential chasers to cut a thread on a work piece, but in the drawing two adjacent chasers and their holders have been omitted for clearer illustration of the gage. It will therefore be understood that the chaser holders and chasers illustrated are an adjacent pair of a full complement of four and are 90 degrees apart on the face of the die head 20, i.e., all corresponding elements of the chasers and chaser holders are mutually perpendicular.

The setting gage of this invention is designed to be seated on one chaser holder, using a surface of the chaser held in that chaser holder as a datum surface while gaging the location of the cutting edge of a chaser held in the adjacent chaser holder. Thus, in FIGURES 1 and 2, the chaser holder 22 supports the chaser setting gage and adjustably carries a chaser 24 held in position by a clamp 25. Spaced 90 degrees around on the face of the die head 20, a second chaser holder 26 is mounted in the conventional manner and supports a chaser 28 perpendicular to the chaser 24. The chaser 28 is held in cutting position by the usual clamp 30 and clamp screws 32. The cutting edge of the chaser 28, which is the edge to be accurately located in this example, is designated by the reference numeral 34 while at the opposite end of the chaser 28 an abutting screw 36 is provided to absorb the cutting forces imposed tangentially on the chaser and to adjust the longitudinal position of the chaser when the clamp screws 32 are loosened.

For convenience of reference in the following description the direction away from the face of the die head, i.e., toward the right in FIGURE 2 will be referred to as "upward" and the direction toward the left in FIGURE 1 will be characterized as "forward."

The novel chaser setting gage comprises a block 40 having plane pads 42 on one side for seating the block on the top of the chaser holder 22. The block 40 is provided with a rectangular flange 44 having an inner plane surface 46 adapted to rest against the multi-grooved surface of the chaser 24 when the block 40 is seated atop the chaser holder 22.

The top surface 48 of the block 40, i.e., the surface opposite the seating surfaces 42, has machined therein a rectangular groove 50 in which is received a closely fitting key 52 (FIGURE 3) formed integrally on a carrier member 54. A screw 56 passes through an elongated slot 58 in the carrier member 54 into the block 40 to secure the carrier member to the block. The slot 58 is parallel to and within the lateral surfaces of the key 52. Thus, when the screw 56 is loosened the carrier member 54 may be adjusted on the block 40 in a direction parallel to the groove 50. A pair of set screws 60 and 62 are threaded into the carrier member 54 at opposite ends of the slot 58 to engage the body of screw 56 to enable the carrier member 54 to be adjusted in small increments and to hold it in adjusted position.

The carrier member 54 extends forwardly across the top of block 40 beyond the cutting edge 64 of the chaser 24. At one forward corner, a rectangular notch 66 is formed in the carrier member 54 to provide a seat for the upper halves of a pair of leaf springs 68. A clamp member 70 holds the spring 68 in the notch 66 and is itself secured therein by screws 72 which pass through notches 74 (FIGURE 3) in springs 68 and are threaded into the carrier member 54.

A gage finger 76 is attached to the downwardly projecting halves of springs 68 by screws 78 and by a clamp member 80 and extends downwardly beyond the seating surfaces 42 of the block 40. As shown in FIGURES 2 and 4, the lower end of gage finger 76 has a thin extension 82 adapted to project between the chaser 24 and the cutting edge 34 of chaser 28, contacting the latter. The clamp member 70 extends downwardly and substantially parallel to the gage finger 76 and is provided with a projection 84 which lies closely adjacent the gage finger 76. The stationary projection 84 limits the swinging movement of the gaging finger 76 in one direction.

A further forward extension 86 of the carrier member 54 is substantially coextensive with the clamp member 70. An opening 88 passes transversely through the extension 86 which is slotted at 90 to permit the cap screw 92 to clamp the barrel 94 of a dial indicator 96 in the opening 88. The stem 98 of the dial indicator extends through the barrel 94 into contact with the gaging finger 76. A pin 100 is embedded in a side of the block 40 and projects therefrom substantially beyond the axis of plunger 98.

To position the chaser 28 with the apparatus described above, the clamp screws 32 on chaser holder 26 are loosened to free the chaser for adjustment toward or from the center of the die head. The block 40 is placed as shown in FIGURES 1 and 2 with the seating surfaces 42 in contact with the top of chaser holder 22 and with the surface 46 in contact with the multi-grooved surface of the chaser 24. This surface of the chaser has previously been located accurately a fixed distance from the axis of the die head, a distance dependent upon the diameter of the thread to be cut and set by the diametrical adjusting means in the die head. This multi-grooved surface therefore constitutes a precise datum surface for positioning the gage.

The position of the carrier member 54 must be adjusted by the screws 60 and 62 so the extension 82 of the gaging finger 76 is substantially vertical and is in contact with the cutting edge 34 of the chaser 28 and out of contact with the projection 84. The abutting screw 36 is then employed to move the chaser 28 toward or away from the center of the head and any such movement of the chaser 28 is accurately registered on the dial indicator 96.

The customarily desired position of chaser 28 is such that its cutting edge 34 lies on a diameter of the workpiece perpendicular to the line of tangency of the chaser to the workpiece, i.e., the line A in FIGURES 1 and 2. To employ the gage of the invention in the most convenient manner, therefore, the distance between the diameter A and the line B is determined by calculation, the line B being parallel to line A and tangent to the distal side of the pin 100. Thus, the pin 100 and indirectly the block surface 46 is used as a measuring datum. The calculated distance may be set on a pair of micrometers which are then applied (with the gage removed from the die head) to the contact surface of the gaging finger 76 and the point of tangency of the line B with the pin 100. After loosening screw 56, the screws 60 and 62 are manipulated to adjust the position of the carrier member 54 as required. The screw 56 is then tightened and the dial of the indicator 96 may be set to zero. Thus, the gage is so set that when it is in the position described above the dial will read zero when the cutting edge 34 is moved to coincide with the diameter A.

At times, unusual conditions of thread profile, material characteristics, etc., require the cutting edge 34 to be offset with respect to the diameter A. The amount of such offset is determined empirically and may be measured directly on the dial indicator if the instrument is properly calibrated. In the example shown, the movement of the gaging finger 76 is basically that of a lever with a fulcrum at point 102 (FIGURE 2). If the length of the lever arm to the point of contact with the indicator stem 98 is made exactly half the length of the lever arm to the point of contact with the cutting edge 34 and the dial indicator 96 is calibrated to read twice the displacement of the stem 98, the precise displacement of the cutting edge 34 may be read on the dial.

It will be apparent that the gage is adaptable to any operating position of the die head since the dial indicator 96 may be turned to any conveniently readable position by loosening and subsequently retightening the clamp provided by the screw 92. It will also be apparent that the above-described adjustability of the carrier member 54 will permit the gage to be used for a wide range of distances between the surface 46 and the contact surface of the gaging finger 76, i.e., for a wide range of workpiece diameters.

In the four-chaser head illustrated, the plane of movement of the gaging finger 76, the axis of the indicator stem 98 and the direction of adjustment of the carrier member 54 are all 90 degrees from the datum surface 46. In the case of a die head having a different number of equally spaced chasers and chaser holders, for example 3, 5 or 6, it is evident that the above principles are also valid and that the structure can be adapted by changing the above angle from 90 degrees to 120, 72 or 60 degrees for the examples mentioned.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A device for setting one of a plurality of tangential thread cutting chasers with respect to a second chaser, each chaser having a multi-grooved side surface and a cutting edge on one end thereof and being adjustably mounted for movement parallel to its multi-grooved surface in a die head having a flat front surface, said device comprising support means having a locating surface engageable with said flat front surface, a datum surface carried by said support means and extending essentially perpendicular to said locating surface for engagement with the multi-grooved surface of said second chaser when said locating surface engages said flat front surface, a gaging arm, means mounting said gaging arm on said support means for limited swinging movement toward and away from said datum surface, said gaging arm havnig a gaging surface engageable with the cutting edge of said one chaser, and micrometric means carried by said support means for registering the location of said gaging arm.

2. The combination according to claim 1 wherein the means for mounting said gaging arm comprises a leaf spring connecting one end of said gaging arm to said support means and wherein said gaging surface is adjacent the opposite free end of said gaging arm.

3. The combination according to claim 2 wherein said support means comprises a base member and a carrier member adjustable with respect to said base member in the direction of movement of said gaging arm, said datum surface being stationary with respect to said base member, said gaging arm being attached to said carrier member and said micrometric means being carried by said carrier member.

4. The combination according to claim 2 wherein said micrometric means is mounted to contact said gaging arm midway between the ends of said arm whereby the movement induced in said micrometric means is equal to one-half the movement of said gaging surface.

5. The combination according to claim 1 together with means for securing said micrometric means to said support means to permit said micrometric means to be revolved 360°.

6. The combination according to claim 1 together with means providing a fixed reference surface on said support means, said reference surface being a fixed distance from said datum surface and said reference surface being disposed for convenient micrometric measurement of the distance therefrom to said gaging surface.

References Cited by the Examiner

UNITED STATES PATENTS

| | | | |
|---|---|---|---|
| 2,112,491 | 3/1938 | Hintz | 33—185 X |
| 2,124,014 | 7/1938 | Street | 33—178 |
| 2,126,495 | 8/1938 | Padgett | 33—148 |
| 2,585,828 | 2/1952 | Pearson | 33—174 |
| 2,698,485 | 1/1955 | Johnson | 33—172 |
| 2,710,454 | 6/1955 | Kershaw | 33—174 |
| 3,069,780 | 12/1962 | Miller et al. | 33—185 |

LEONARD FORMAN, *Primary Examiner.*

SAMUEL S. MATTHEWS, *Examiner.*